INVENTOR.
FRITZ A. GUERTH

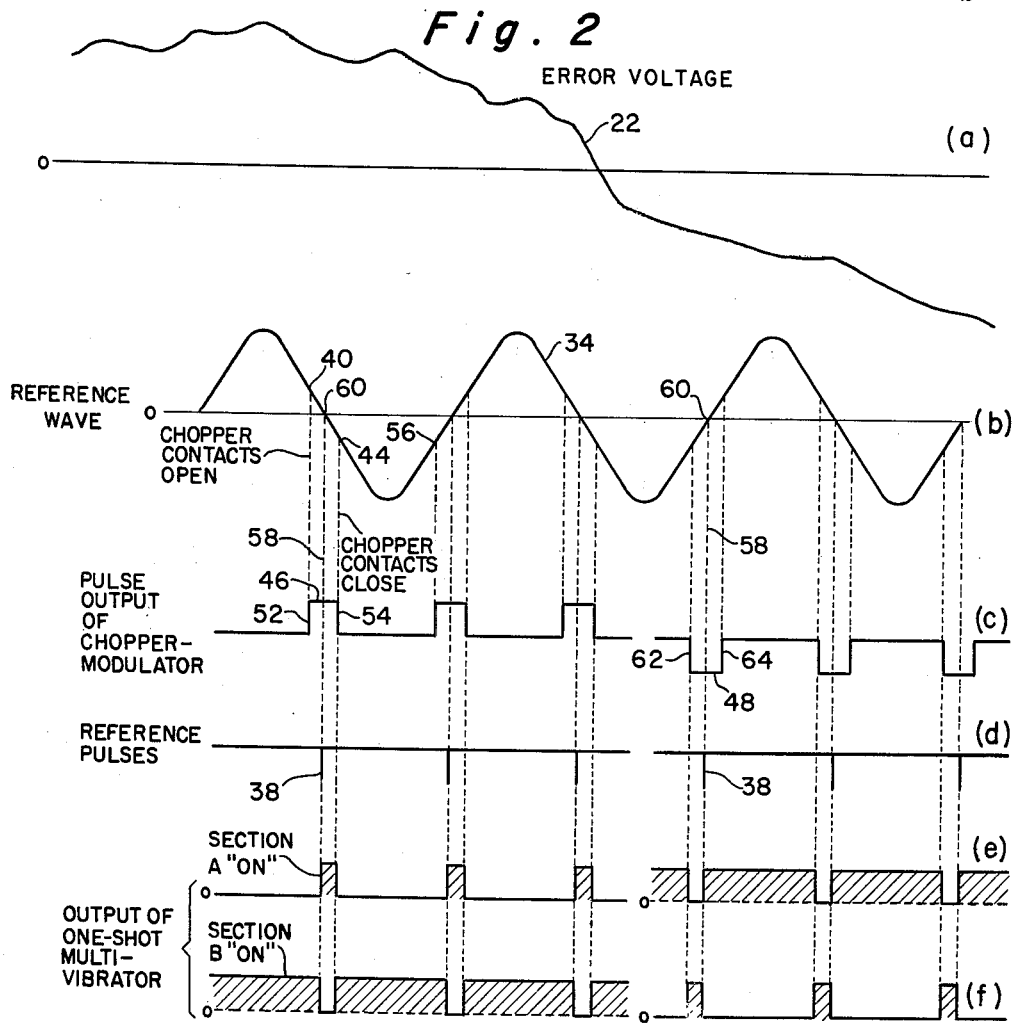
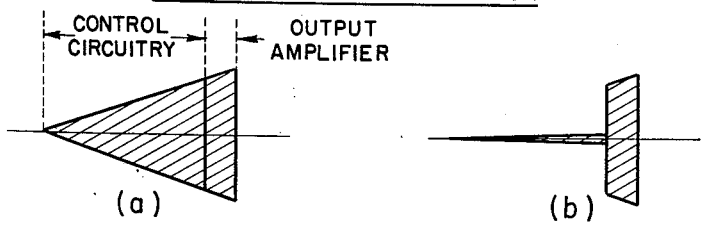

3,079,539
SERVOSYSTEM AND PULSE TYPE AMPLIFIER
Fritz A. Guerth, 50 Lori Road, Camarillo, Calif.
Filed Aug. 15, 1960, Ser. No. 49,805
6 Claims. (Cl. 318—28)
(Granted under Title 35, U.S. Code (1952), sec. 266)

The invention described herein may be manufactured and used by or for the Government of the United States of America for governmental purposes without the payment of any royalties thereon or therefor.

The present invention relates in general to electrical amplifiers of the type intended to accept input variations of either positive or negative polarity. The invention is particularly useful in connection with so-called servo systems, in which an error signal is developed corresponding to the departure of some component such as a shaft from a desired angular position or from a predetermined operating status.

Servomechanisms of the type to which the present invention is especially applicable customarily include a feedback generator the voltage output of which contains information respecting the operation of the servomotor and hence data concerning the component driven thereby. When the motor is so energized as to rotate in a given direction, then the output of the feedback generator will be of a certain polarity and will have an amplitude which generally is a function of motor speed. On the other hand, when the direction of rotation of the motor is reversed, then the polarity of the voltage produced by the feedback generator will also reverse. Thus the generator output can be employed to control the motor so as to determine its direction of rotation and thereby return the component being regulated to the position or condition from which it departed and which departure initiated the generation of that particular error signal.

Many servo systems now utilized to monitor the position or condition of a movable member are relatively complex and incorporate components of large physical size and/or electrical capacity. This is especially true, for example, with respect to installations on aircraft intended for operation at supersonic speeds, where large amounts of power are needed to vary the position of an airfoil due to the extreme pressures developed thereon. Similar requirements exist for guided missiles and rockets, where directional changes at high velocity are attained only through the use of power-generating devices requiring considerable amounts of energy for their operation. To control this energy, feedback networks must include a number of stages of amplification all of which add to the size and weight of the apparatus. In many cases, space limitations imposed by missile and rocket design are so severe that an adequate factor of safety frequently cannot be incorporated into these servomechanisms, thus increasing the possibility of a malfunction and hence a failure of the mission being undertaken.

In servos of the type discussed above, the error voltage output wave which represents the direction and amount of departure of the load member from a desired optimum condition is customarily amplified and applied directly to the servomotor to regulate the direction of rotation thereof. As a consequence, the amplifier circuitry must be designed to pass this wave substantially in its entirety. In accordance with a feature of the present invention, however, it has been found that such "total" amplification is unnecessary, and, instead, essentially all of the servomotor operating energy can be developed in a single power output stage immediately preceding the motor input terminals. Instead of passing the error voltage in its original form through the amplifier up to this final power stage, it is possible to substitute therefor pulses of extremely short time duration which are representative of the polarity of the error voltage and which serve to determine the direction of current flow from the power amplifier to the servomotor as well as the time period during which this current flow is effective. The control pulses thus utilized in the initial stages of the amplifier contain very little energy as compared to the entire error signal, and hence the circuit components through which they pass need be only a fraction of the size and weight of those required to handle the entire feedback wave when the latter is conducted directly to the power output stage as in standard arrangements.

In accordance with a preferred embodiment of the present invention as applied to a servo system, the error voltage representing the difference between the output of the feedback generator and the control voltage input is periodically modulated by some standard device such as a chopper. The latter is arranged to develop extremely narrow pulses which extend in a direction dependent upon the polarity of the feedback generator output at the time the modulation is carried out. A further series of cyclically-recurring reference pulses is generated, and these latter pulses, together with those from the chopper, are respectively applied to the two sections of a multivibrator which is of the bi-stable type, or, in other words, which has two steady-state conditions. The latter is connected to the input terminals of the power amplifier such that this amplifier produces an output current flow the direction of which is governed by the steady-state condition of the multivibrator at that particular instant of time.

The multivibrator is so arranged that it is responsive to input pulses of a single polarity only. Consequently, when the error voltage is, for example, positive, then the output of the modulator will consist of a series of positive pulses the trailing edges of which have a definite phase relationship to the leading edges of the reference pulses (which are of negative polarity) so that the multivibrator will assume one of its two steady-state conditions, and the servomotor will be energized to rotate in a particular direction. On the other hand, when the error voltage is negative, then the leading edges of the pulses representing the modulated error voltage will have a different phase relationship to the leading edges of the negative reference pulses, and the multivibrator will assume the other of its steady-state conditions to reverse the flow of current to the servomotor and hence change its direction of rotation. Thus, motor regulation is accomplished in accordance with the time relationship between corresponding portions of narrow pulses containing relatively little energy, these pulse portions merely serving as a means for controlling the principal power-developing section of the amplifier. Since this power generation need occur only at a point immediately preceding the servomotor, many conventionally large components in the initial section of the amplifier may be replaced by elements of considerably less physical and/or electrical capacity.

One object of the present invention, therefore, is to provide an improved form of electrical control circuit especially adapted for the amplification of an input wave which is subject to variations in polarity.

Another object of the invention is to eliminate the necessity for amplifying a bi-directional input wave in its entirety, and instead develop control pulses of short duration which are representative of the polarity of this input wave at any given instant of time and which serve to determine the periods during which an output circuit possesses any one particular operating status.

A still further object of the invention is to generate a series of pulses occurring at a predetermined constant frequency, the direction in which the pulses extend being representative of the polarity of an input wave, and then to generate a second series of pulses at a similar frequency, such that the time relationship between corresponding portions of the pulses of the two series will vary as a function of variations in the polarity of the input wave from which the first-mentioned series of pulses is derived.

Other objects and many of the attendant advantages of this invention will be readily appreciated as the same become better understood by reference to the following detailed description when considered in connection with the accompanying drawings wherein:

FIG. 2 is a set of wave forms appearing at various points in the circuit of FIG. 1, and useful in explaining the operation of such circuit; and FIGS. 3(a) and (b) are graphs of the relative power consumption in a conventional amplifying circuit and in the amplifying circuit of FIG. 1.

Figure 1:
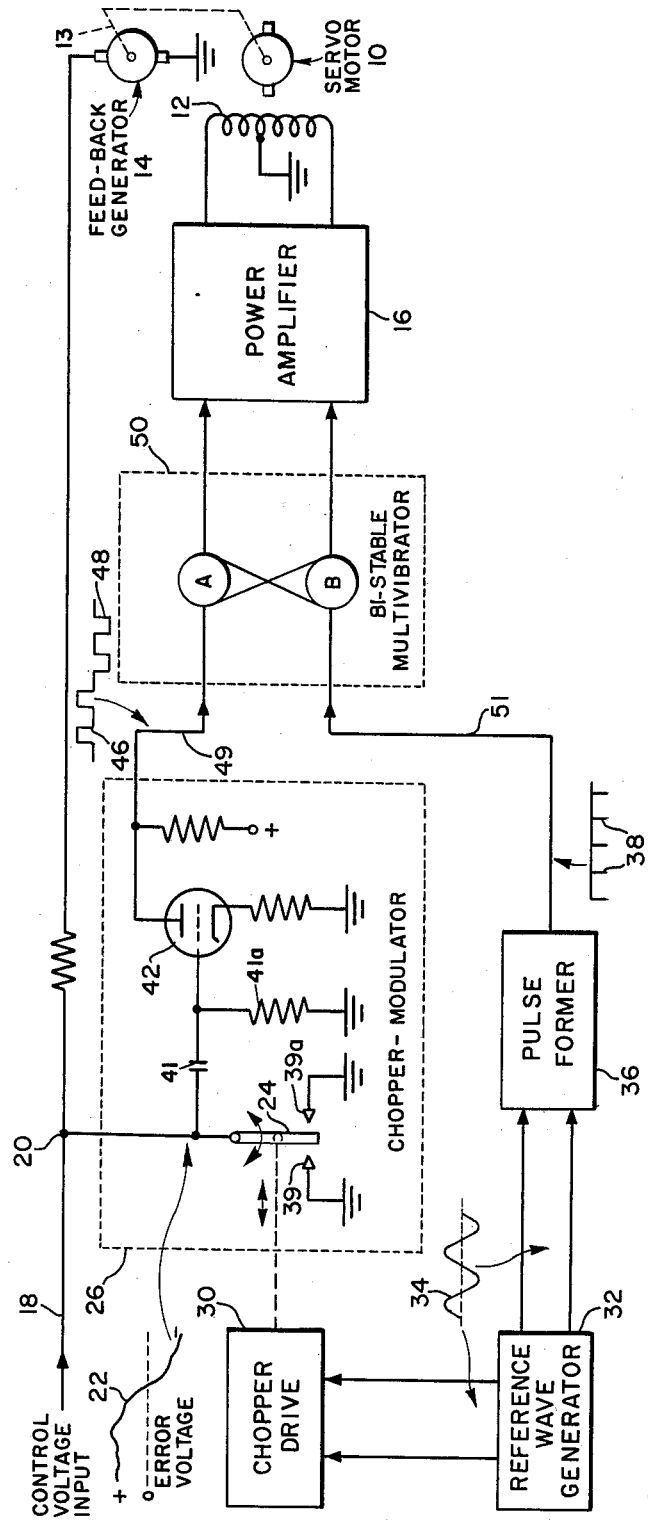
FIG. 1 is a schematic representation of a servo system incorporating an amplifying network designed in accordance with a preferred embodiment of the present invention.

Referring to FIG. 1 of the drawings, there is shown a conventional servomotor generally identified by the reference numeral 10. Motor 10 includes the usual winding 12 the center point of which is grounded as illustrated. The shaft of motor 10 is coupled by means of a mechanical connection 13 to the shaft of a feedback generator 14 so that the two shafts rotate in synchronism. Energy for operation of motor 10 is developed in a power amplifier 16, the latter being designed so that the direction of current flow through winding 12 determines the direction of rotation of the motor shaft. This arrangement is conventional in arrangements of this general type.

Feedback generator 14 develops during system operation an output voltage which extends in a certain direction of polarity when the generator shaft is rotating in one direction, and in an opposite direction of polarity when the rotation of the generator shaft is reversed. Consequently, this voltage is also indicative of the rotational status of the servomotor 10 to which the generator is coupled.

A control voltage is applied to the system of FIG. 1 over a conductor 18. This control voltage is combined with the feedback generator voltage at junction point 20 to form an error voltage 22 representative of the difference therebetween, and hence indicative of the amount by which the servomotor 10 is departing from the operational status called for by the control voltage input. This error voltage appearing at point 20 is applied to the moving contact 24 of a so-called "chopping" device which forms the major part of a modulator generally designated by the reference numeral 26.

The function of the modulator 26 is to develop from the error voltage variation a series of output pulses of a predetermined constant frequency and extending in a direction dependent upon the polarity of the input energy. To bring this about, the movable contact 24 of the chopper is periodically grounded by mechanical actuation produced by a driving mechanism 30, which may be a vibrator of any known type. The frequency of operation of the driving mechanism 30 is synchronized by a reference wave from a generator 32, this reference variation preferably, but not necessarily, being of sine wave shape.

Reference to curves (a) and (b) of FIG. 2 indicates the general relationship between the wave 22, which represents the error voltage at point 20, and the reference wave 34 which is applied not only to synchronize the chopper driving apparatus 30 but also to pulse former 36 which acts to develop from wave 34 a negative-going reference pulse of extremely short duration (such, for example, as one or two microseconds) each time that wave 34 passes through a level representing zero voltage. Since the wave 34 is of symmetrical form, the time spacing of the output pulses 38 from the pulse former 36 will be constant as indicated in curve (d) of FIG. 2.

The driving mechanism 30 for the movable contact 24 of the chopper operates in such a manner that this contact engages one or the other of the grounded stationary contacts 39 and 39a during a large portion of each cycle of operation of the wave generator 32. Reference to curve (b) of FIG. 2 brings out that, during each cycle of the sine wave 34, the movable contact 24 leaves one of its grounded terminals 39 or 39a at the time instant indicated by the numeral 40 and hence allows current to pass through a grid-leak condenser 41 and its associated resistor 41a to the control electrode of an electron tube 42 (FIG. 1) until the other terminal is contacted at the time instant represented in curve (b) by the reference numeral 44. Consequently, the output of tube 42 is a positive-going pulse 46 (see curve (c)) whenever the error voltage wave 22 is of positive polarity. In similar fashion, when wave 22 is of negative polarity, then the negative voltage on the grid of tube 42 will cause an output pulse 48 of negative polarity to result. The pulses 46 and 48 are applied over conductor 49 to one section (hereinafter designated as section A) of a bi-stable multivibrator 50. The negative-going reference pulses 38 are applied from the pulse former 36 over conductor 51 to the remaining section B of multivibrator 50 as illustrated in the drawings.

Referring again to curve (b) of FIG. 2, it will be noted that the movable contact 24 of the chopper opens (that is, it leaves either grounded contact 39 or 39a) at the point represented by the reference numeral 40. This results (when voltage 22 is positive) in the production of the leading edge 52 of the positive pulse 46 shown in curve (c). The width of this pulse 46 is determined by the time spacing between the points 40 and 44 on the sloping portion of the sine wave 34 of curve (b). When this latter point 44 is reached in time, the contact 24 is again grounded to produce the trailing pulse edge 54. The contact 24 then remains grounded until it is again opened at a time instant represented by the reference numeral 56. Thus a series of positive pulses are developed the width of which is a function of the slope of the reference wave 34 and/or the speed of operation of the chopper driving mechanism 30. Such pulse width has been greatly exaggerated in the drawing for explanatory purposes, and in practice will preferably be in the order of ten microseconds. Regardless of the width of the pulses 46, however, they are always symmetrical about an axis 58 which represents the time instant 60 when the reference wave 34 passes through zero.

As above stated, however, this instant 60 when the reference wave 34 is of zero amplitude represents the time production by the pulse former 36 of one of the shorter duration negative-going timing or reference pulses 38. Thus as shown by curves (c) and (d) of FIG. 2, a pulse 38 is always spaced intermediate the leading and trailing edges 52 and 54, respectively, of one of the positive pulses 46.

In similar fashion, the chopper contact 24 acts to modulate the feedback voltage wave 22 when such voltage extends in a negative direction of polarity. As illustrated by the right-hand portion of curve (c) in FIG. 2, a series of negative-going pulses 48 are generated under such conditions each of which has a leading edge 62 and a trailing edge 64. As in the case of the positive pulses 46, each negative pulse 48 is symmetrical about axis 58, the only distinction between the pulses 46 and 48 being that the negative-going trailing edge 54 of pulse 46 follows the corresponding negative-going reference pulse 38, while, in the event that the feedback voltage 18 is negative, the negative-going leading edge 62 of pulse 48 precedes in time the corresponding negative-going reference pulse 38.

This time relationship between the negative-going portions of the respective pulses is utilized to control the output of the power amplifier 16 (FIG. 1) and hence the direction of current flow through the servomotor winding 12. To accomplish such a control function, each section A and B of the multivibrator 50 is arranged to be responsive only to a negative-going voltage respectively applied thereto over the conductors 49 and 51. In other words, reception by either the multivibrator sections of a negative-going voltage causes such section to change to the other of its steady-state conditions. The output of each multivibrator section during time periods when the error voltage is either positive or negative is shown in the two curves (e) and (f) of FIG. 2.

Assuming first that the error voltage 22 is positive, a series of positive pulses 46 appear in the output of the modulator 26, these positive pulses 46 being received by section A of the multivibrator. At the same time the series of negative-going reference pulses 38 (representing the output of the pulse former 36) is applied over conductor 51 of section B of the multivibrator. Considering now the left-hand portion of each of curves (c) and (d) of FIG. 2, it will be noted that the negative-going reference pulse 38 precedes in time the negative-going trailing edge 54 of the chopper output pulse 46. Consequently, the multivibrator 50 is placed in one of its steady-state conditions at the time represented by the instant of occurrence of pulse 38, and is then quickly placed in the other of its two steady-state conditions by the occurrence of the trailing edge 54 of pulse 46. The actual time duration of this particular condition of multivibrator equilibrium is thus very short, and can be represented by the shaded portion of curve (e). If the latter represents the output energy from section A of the multivibrator, then curve (f) will represent the output of multivibrator section B. The shaded portion of curve (f) (such shaded portion representing the actual energy in the wave) results in the production by the power amplifier stage 16 of a current flow through winding 12 in a particular direction and hence determines the direction of rotation of the servomotor shaft. Incidentally, operation of the servo system has been explained herein on a velocity basis, but it is possible to obtain voltage variations representative of positional conditions, acceleration, etc. without modifying the basic principles involved.

However, when the polarity of the error voltage wave 22 is negative, the conditions existing in the right-hand portion of FIG. 2 prevail. Instead of preceding the negative-going edge of pulse 48, the reference pulse 38 now follows in time the negative-going pulse edge 62. Inasmuch as only these negative-going portions of the respective pulses actuate the multivibrator 50, it will be appreciated that under the conditions now being described section A of the multivibrator will have its condition changed by the pulse portion 62 and then almost immediately changed again by the reference pulse 38. The output conditions described in connection with the pulse 46 are now reversed, that is, section A of the multivibrator is "on" throughout the time periods indicated by the shaded portion of curve (e), while multivibrator section B is now "on" only for the time periods indicated by the shaded portion of curve (f). Current flow through the motor winding 12 is now in a reverse direction from that described above. Thus motor control is achieved by the application of very short pulses to the multivibrator to control the duration of each of its respective steady-state conditions, such conditions governing the output of a current-generating device which performs the actual function of supplying energy to the servomotor winding.

In summation, it can be stated that, during intervals when an input voltage is of one polarity, a pulse is generated the leading edge of which is effective to change the status of a multivibrator of "flip-flop" network from one of its steady-state conditions to the other. A timing or reference pulse follows such action in time. When the input voltage is of opposite polarity, the timing or reference pulse initiates the action of changing the multivibrator from one to the other of its steady-state conditions, while the trailing edge of the pulse derived from the input voltage restores the multivibrator status which originally prevailed. In effect, therefore, a reference pulse may be said to turn "on" a bi-stable multivibrator (the terms "on" and "off" being for descriptive purposes only) under one set of polarity conditions, and to turn "off" the multi-vibrator under a different set of polarity conditions. In either instance, only the pulses themselves bring about the control effect, the energy required in the output circuit not being generated until a point just ahead of the utilization apparatus. The amount of power passing through the initial amplifier stages (as represented by the pulses themselves) is thus negligible in comparison with systems in which the entire input signal per se is amplified. The difference in power consumption of applicant's system as compared with conventional methods is graphically illustrated in FIG. 3 of the drawings, wherein the shaded portion of graph (a) is of considerably larger area than the shaded portion of graph (b). The left-hand section of the latter graph brings out quite clearly how little actual power is contained in the pulses generated by the networks 26 and 36 of FIG. 1, and hence how much less stringent are the requirements for any circuit component through which such pulses may pass as compared to circuit elements in arrangements previously considered essential to obtain the same results.

Obviously many modifications and variations of the present invention are possible in the light of the above teachings. It is, therefore, to be understood that within the scope of the appended claims the invention may be practiced otherwise than as specifically described.

I claim:

1. In an amplifier: a source of data voltage which is subject to variations between conditions of positive and negative polarity; a reference wave generator developing an output of essentially constant frequency and phase, the recurrence frequency of such reference wave being substantially greater than the average rate at which said data voltage varies in polarity; a modulator; a circuit for applying said data voltage to said modulator; means synchronized by said reference wave for operating said modulator so that said data voltage is modulated at the recurrence frequency of said reference wave, such modulation resulting in the development of a series of positive control pulses from said modulator during the interval of time when said data voltage is of positive polarity and a series of negative control pulses during the interval of time when said data voltage is of negative polarity, the pulses thus developed being of uniform time duration and bearing a definite phase relationship to said reference wave; a circuit for developing a series of unidirectional pulses of extremely short duration as compared to the time duration of said control pulses, one such reference pulse being generated for each reversal in polarity of said reference wave, the said reference pulses respectively occurring at instants of time midway between the leading and trailing edges of the control pulses with which they are respectively associated; a two-section bi-stable multivibrator; connections for applying said series of control pulses to one section of said multivibrator and said series of reference pulses to the other section thereof, said multivibrator being designed to change from one of its steady-state conditions to the other upon and only upon the reception by either section of a negative-going voltage; and a utilization circuit receiving the output of said multivibrator, whereby, when said data voltage is positive, a negative reference pulse will precede in time the negative-going trailing edge of the control pulse with which it is associated and the said one section of said multivibrator will enter into and remain in one of its steady-state conditions for only the period of time elapsing therebetween, while, when said data voltage is negative, a negative reference pulse will follow in time the negative-going leading edge of the control pulse with which it is associated to cause said other multivibrator section to enter into one of its steady-state conditions, in which condition it will remain until the reception by said one multivibrator section of the negative-going leading edge of the next succeeding control pulse from said modulator.

2. The combination of claim 1, in which said modulator comprises a chopper, and said means for operating said modulator includes means for actuating said chopper at the repetition frequency of said reference wave.

3. A circuit for amplifying a data voltage wave which is subject to non-cyclic variations between conditions of positive and negative polarity, said circuit including means for cyclically modulating said data voltage at a constant predetermined frequency, means for developing a first series of regularly-recurring pulses representative of the cyclic modulation of said data voltage, each pulse so developed being of a polarity determined by the polarity of the said data voltage during the corresponding period of time, a circuit for generating a second series of regularly-recurring unidirectional pulses at the same constant predetermined frequency, each pulse of said second series being of shorter time duration than the pulse of said first series with which it is associated and being symmetrically time-spaced between the leading and trailing edges of the latter, whereby, when the pulses of said first series are of one polarity, one edge of each pulse thereof precedes in time that edge of the corresponding pulse of said second series which extends in the same direction of polarity, and, when the pulses of said first series are of the other polarity, one edge of each pulse thereof follows in time that edge of the corresponding pulse of said second series which extends in the same direction of polarity, utilization means having two steady-state conditions, and a circuit for applying the pulses of said two series to said utilization means to cause the latter to assume a particular steady-state condition determined by the time relationship of corresponding edges of the pulses in said two series which edges extend in the same direction of polarity.

4. A circuit according to claim 3 in which the said utilization means comprise a bi-stable multivibrator having a pair of sections to which the pulses of said two series are respectively applied, each such multivibrator section being responsive only to voltage variations extending in one particular direction of polarity.

5. In a servomotor control circuit, a servomotor having at least one winding, the direction of rotation of said servomotor being dependent upon the direction of current flow through said winding, a feedback generator coupled to said servomotor, said feedback generator acting to develop an output voltage the polarity of which is determined by the direction of servomotor rotation, a source of control voltage, means for combining said control voltage with the output voltage of said feedback generator to develop an error voltage, means for modulating said error voltage at a constant predetermined frequency to develop a first series of pulses of relatively short time duration compared to each cycle of operation of said modulating means, a circuit for developing a second series of pulses of unidirectional polarity and at the said constant predetermined frequency, a control device receiving the said two series of pulses and responsive to the phase relationship between similar portions of corresponding pulses in said two series, such phase relationship being different when said error voltage is positive from that which exists when said error voltage is negative, and a current-generating circuit receiving the output of said control device and generating a current flow through the winding of said servomotor the direction of which flow is dependent upon the operative status of said control device.

6. A servomotor control circuit according to claim 5, in which said control device possesses two steady-state conditions, the particular one of such conditions assumed by said device being determined in accordance with the phase relationship existing at any instant of time between similar portions of those corresponding pulses of said two series which are received thereby.

References Cited in the file of this patent

UNITED STATES PATENTS

| | | |
|---|---|---|
| 2,115,086 | Riggs | Apr. 26, 1938 |
| 2,760,132 | Pawley | Aug. 21, 1956 |
| 2,809,339 | Guggi | Oct. 8, 1957 |
| 2,905,876 | Hillman | Sept. 22, 1959 |

OTHER REFERENCES

Cockrell, W. D.: Industrial Electronics Handbook, First edition, page 426, FIGURE 4B-11; McGraw-Hill, New York, 1958 KW44.

Terman, F. E.: Radio and Electronic Engineering, Fourth ed., page 632, McGraw-Hill, New York, 1955 (Div. 26).